Figures 1, 2:
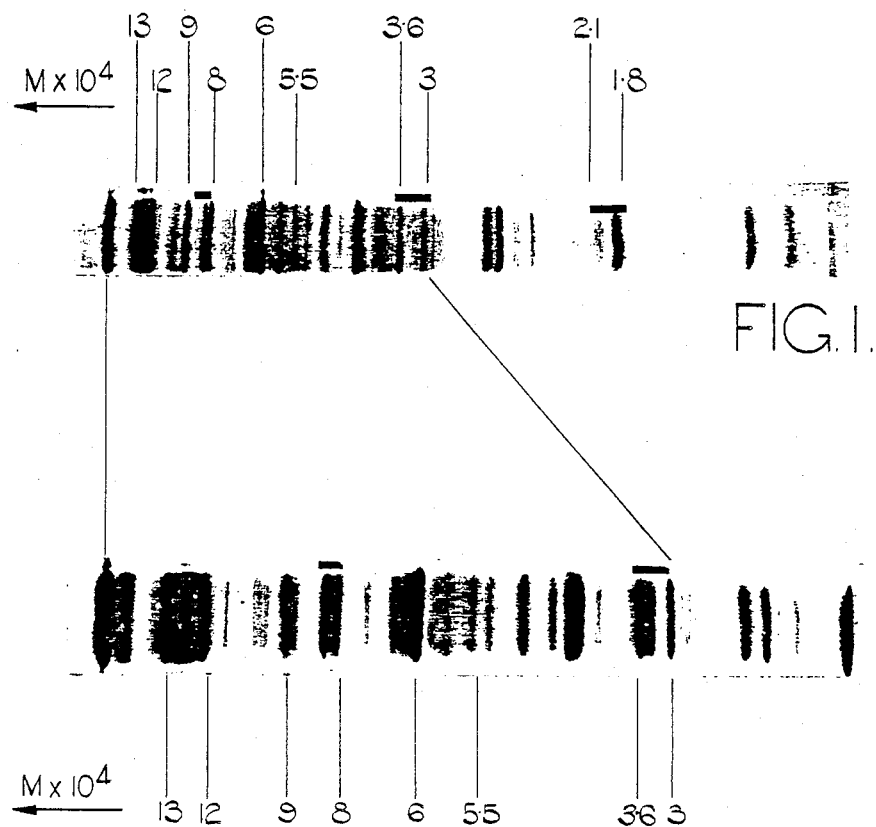

United States Patent [19]

Skinner et al.

[11] Patent Number: 4,816,250

[45] Date of Patent: Mar. 28, 1989

[54] **PREPARING VACCINE AGAINST *HERPES SIMPLEX* VIRUS**

[75] Inventors: Gordon R. B. Skinner, Solihull; Alexander Buchan, Harborne, both of England

[73] Assignee: University of Birmingham, Birmingham, United Kingdom

[21] Appl. No.: 478,333

[22] Filed: Mar. 24, 1983

[30] Foreign Application Priority Data

Mar. 24, 1982 [GB] United Kingdom ............... 8208680

[51] Int. Cl.$^4$ ............................................. A61K 39/245
[52] U.S. Cl. ..................................... 424/89; 435/235; 435/237; 435/238
[58] Field of Search .................. 424/89; 435/235, 237, 435/238

[56] References Cited

U.S. PATENT DOCUMENTS 4,317,811  3/1982  Bertland et al. ...................... 424/89
4,452,734  6/1984  Larson et al. .................... 260/112 R

FOREIGN PATENT DOCUMENTS 0001365  9/1978  European Pat. Off. .
2037165A 12/1979  United Kingdom .

OTHER PUBLICATIONS

Skinner et al., Br. J. Exp. Path., vol. 63, No. 2, pp. 378–387 (1982).
Skinner et al., Br. J. Ven. Dis., vol. 58, No. 6, pp. 381–386 (1982).
Skinner et al., Med. Microbiol. Immunol. 169, 39–51 (1980).
Muramatsu, "Isolation of Nuclei and Nucleoli", Cell Physiology, IV, pp. 195–228, 1981.
Alberts et al., "Molecular Biology of the Cell", Garland Publishing Company, New York, 1983, p. 145.
Glauret, "Practical Methods in Electron Microscopy", North–Holland Publishing Company, Amsterdam, 1975, p. 44.
Heide et al., "Plasma Protein Fractionation", The Plasma Proteins, vol. 3, Academic Press, New York, 1977, pp. 548–550.
Harris, "Techniques in Experimental Virology", Academic Press, 1964, p. 157.
Pearson et al., *Proc. Natl. Acad. Sci.*, 74, 2546–2550 (1977), "Isolation of Virus–Free *Herpesvirus* Saimiri Antigen–Positive Plasma Membrane Vesicles".

*Primary Examiner*—Sidney Marantz
*Attorney, Agent, or Firm*—Eugene M. Bond

[57] ABSTRACT

A vaccine against a DNA virus, for exmaple, *Herpes simplex* virus, is prepared by incubating a cell sample which has been infected with the virus, releasing the nuclei in the infected cell material from the cytoplasmic fraction of that material, chemically fixing the polypeptide chains in the cytoplasmic fraction, and forming a precipitate which includes the virus antigens in the cytoplasmic fraction, the precipitate providing the active constituent of the vaccine. A characteristic strain of the virus is preferred, and transfers its characteristics to the vaccine so that vaccinated subjects may subsequently be distinguished from infected subjects.

22 Claims, 1 Drawing Sheet

PREPARING VACCINE AGAINST *HERPES SIMPLEX* VIRUS

It has been proposed, for example in published U.K. Patent Application No. 2037165A, to prepare a vaccine against a viral illness by infecting cells with the virus, treating the infected cell material with a detergent to part the component of the infected cell nuclei from their cytoplasmic fraction, and reacting the cytoplasmic fraction with antibodies to the virus, to form immunocomplexes with the virus antigens, these immunocomplexes providing the required vaccine.

It has hitherto been accepted that in addition to parting the infected cell nuclei from the cytoplasmic fraction, the detergent inactivates all of the residual virus, and in addition inactivates all of the residual virus nucleocapsids. It has not therefore been the practice to treat the cytoplasmic fraction chemically before formation of the immunocomplexes.

In one of its aspects the present invention is based on the discovery that chemical treatment of the cytoplasmic fraction to fix the polypeptide chains of the proteins in the cytoplasmic fraction not only improves the immunogenic quality of the vaccine, but also inactivates residual virus DNA and nucleocapsids, which investigations have shown may be present at this stage.

The invention also relates to a vaccine to Herpes simplex virus (HSV), which is prepared from a selected virus strain having known and characteristic distribution of proteins of particular molecular weights. The use of such a vaccine produces, in a vaccinated subject, antibodies which correspond to the protein groupings, and may enable subsequent determination whether any antibodies present have arisen as a result of vaccination or from infection. According to the invention a method of preparing a vaccine against a DNA virus includes the steps of:

(i) infecting a living cell sample with the virus;
(ii) incubating the infected cell;
(iii) releasing the nuclei of the infected cell material from the cytoplasmic fraction thereof;
(iv) fixing, by chemical reaction, the polypeptide chains in said cytoplasmic fraction; and
(v) forming a precipitate which includes the virus antigens in the cytoplasmic fractions.

According to another aspect, the invention resides in a vaccine prepared by the foregoing method.

According to yet another aspect of the invention a vaccine against Herpes simplex virus includes virus proteins which are markedly present in the following ranges of molecular weights:

$1.8-2.1\times10^4$, $3-3.6\times10^4$ and $8-9-10^4$.

Embodiments of the invention will now be described by way of example only and with reference to a vaccine against a Herpes simplex virus strain whose characteristics are shown by the accompanying drawings, in which:

FIG. 1 shows the electrophoretic distribution of the molecular weights of characteristic proteins of the virus; and FIG. 2 is an expanded electrophoretic distribution of part of FIG. 1.

Herpes simplex virus is a relatively large virus consisting of (1) a nucleoprotein 'core' measuring 75mu in diameter containing double-stranded deoxyribonucleic acid (DNA); (2) a capsid with icosahedral symmetry consisting of 162 capsomeres and, in a certain proportion of particles, (3) a glycoprotein-containing lipoprotein envelope.

An infected cell material is incubated using MRC5 cells, a human embryonic cell line. MRC5 cells are at present the preferred cells, and in some cases their use is mandatory. These cells are, however, slow growing, and recently the possibility has been considered that vaccines obtained by their use could result in a vaccinated person developing an immune reaction to other human tissue, thereby introducing the possibility of rejection of any subsequent tissue transplant. Embodiments of the processes presently described include steps by means of which the cell proteins may be removed and will thereby no longer be able to elicit an immune response. Additionally, removal of the cell protein should overcome objections to the use of cell lines other than MRC5.

For the described example the MRC5 cells are obtained from the National Institute for Biological Standards and Controls, Hampstead, England. These cells are cultivated in Eagle's medium supplemented with 10% foetal or newborn calf serum and 10% tryptose phosphate broth to growth in rotating Winchester bottles (2,500 ml) which normally entailed 3–4 passages. The foetal calf serum is obtainable from Sera-Lab. Plasma Laboratory Limited, Crawley Down, Sussex, England. Tryptose phosphate broth is obtainable from Difco Laboratories, West Molesey, Surrey, England, and sterilized by auto- claving. Aliquots of the cultivated cells are stored in a glycerol-containing medium at −70° C. for subsequent use. The cells are allowed to reach near confluence as sheets within 2,500 ml rotating Winchester bottles. Each cell sheet is subsequently washed with prewarmed Eagles's medium to remove the foetal calf serum. The cells are maintained in a serum-deprived condition for 24 hours. Serum deprivation will tend to result in a significant reduction in the level of virus antigens. Though serum deprivation has previously been considered necessary in order to reduce the level of calf serum in the resulting vaccine, it is envisaged that at least some of the steps described hereinafter, of precipitating virus proteins from the infected cell extract, may allow the serum deprivation step to be omitted entirely, whereby the virus antigen yield may be substantially increased.

After the 24 hours of serum deprivation the cells are washed with pre-warmed Eagle's medium and infected with Herpes simplex virus type 1 (HSV 1). The virus used is the Troisbell strain developed in the Department of Medical Microbiology of the Universtity of Birmingham, England. The virus was isolated from an oral cold sore of an otherwise healthy middle-aged subject, and identified as HSV 1 by neutralisation kinetics, agar gel diffusion tests, and by polypeptide analysis using polyacrylamide gel electrophoresis. The patterns obtained by gel electrophoresis are shown in FIG. 1 and 2 and will be described in detail hereafter. The strain was isolated in human embryonic lung tissue and subsequently cloned three times by limit dilution in a preparation of the MRC5 cells previously referred to. This preparation comprised MRC5 cells cultivated in Eagle's medium containing gamma-irradiated foetal calf serum. The cloned virus was isolated and identified as HSV1 by the methods indicated above, which were used for the original identification.

The Troisbell virus strain is added to the serumdeprived cells at a multiplicity of 5 plaque-forming units per cell. Virus absorption is continued for 1 hour at 37° C. following which the cells are again washed with pre-warmed Eagle's medium and re-incubated.

It has been found that after 24 hours of incubation the cytopathic level of the incubated material is 100%. At this stage each cell sheet is again washed with Eagle's medium and removed from its Winchester bottle. The cells are then suspended in phosphate buffered saline to a concentration of $4 \times 10^7$ cells/ml. Nonidet P40 detergent, obtainable from BDH Chemicals Ltd. of Poole, England, and having the product designation 56009, is added, to a final concentration of 1% by volume, and maintained thus at room temperature. The resulting preparation is centrifuged at about 650 g for 10 minutes and the supernatant, which is the cytoplasmic fraction of the preparation, is collected, the remaining material being discarded. The action of the Nonidet P40 detergent is the part the nuclei of the cells from their cytoplasm and to strip important antigenic proteins from the enveloped virus particle. The Nonidet also reduces, but may not totally eliminate, the infectivity of the virus particles. The supernatant thus at this stage contains virus antigenic proteins and virus particles, human embryonic cell proteins, and proteins from the foetal calf serum, as well as small amounts of extraparticulate virus DNA, together with Nonidet detergent.

The polypeptide chains in the cytoplasmic fraction are stabilized using a known fixing agent such as formaldehyde or glutaraldehyde, to a final concentration of 0.04%. In addition to fixing the polypeptide chains this step inactivates any residual virus and cell DNA and reacts with the virus particles to inactivate any residual virus nucleocapsids.

The resulting fraction is then centrifuged over a cushion of sucrose at a concentration of 20% W/V for 5 hours at $10^5$g, in a wide bucket of 40 ml volume. The sucrose is Grade 1 and is obtainable from Sigma Biochemicals, Poole, England, under the product designation 59378. The 4 ml top fraction in each centrifuge container comprises a purified cytoplasmic fraction which has been found to contain no virus particles or virus nucleic acid, and to consist of virus proteins, together with cell and serum proteins, as well as the formaldehyde, sucrose and detergent previously added.

The purified cytoplasmic fraction is then subjected to a process which precipitates the virus protein from the fraction, either alone or in combination with antibodies to the protein. This precipitation may be accomplished by the following steps, or combinations of steps:

(i) The purified cytoplasmic fraction is passed through an activated sepharose column to which antibodies to the MRC5 cell proteins are covalently bound. The sepharose column may also include antibodies to the foetal calf serum in which the MRC5 cells are incubated. Alternatively the top fraction may be passed through successive activated sepharose columns, to remove any proteins other than the virus antigens.

The foregoing step or steps, cause the unwanted proteins to form antigen/antibody complexes which remain within the column and, as indicated above, enables cell lines other than MRC5 to be used for vaccine preparation and also enables the serum deprivation step to be reduced in duration, or possibly to be eliminated.

(ii) Preferably after removal of the unwanted proteins, aluminium hydroxide adjuvant is added to the preparation and entrains the virus antigens as a washable suspension. The resulting mixture is agitated at room temperature for one hour and subsequently centrifuged at low speed to separate the antigen/ adjuvant suspension. The supernatant, containing the Nonidet detergent, fixing agent (e.g. formaldehyde) and sucrose is discarded and the separated suspension is washed in sterile phosphate buffered saline and forms the required vaccine.

In addtion to enabling the virus antigens to be selected out, the aluminium hydroxide suspension permits washing to remove all traces of the supernatant. The volume of aluminium hydroxide required is a small proportion of the volume of the preparation which is added to it. Large amounts of the preparation may therefore be treated in a container which is not substantially larger than the volume of the preparation currently passing through this step.

The aluminium hydroxide acts as an adjuvant which enhances the effectiveness of the resulting vaccine, and the suspension is readily stored.

(iii) Alternatively, aluminium hydroxide adjuvant is added directly to the purified cytoplasmic fraction, to entrain the virus antigens and proteins from the MRC5 cells as a washable suspension, the mixture being treated as in step (ii) above, to provide the vaccine.

(iv) The purified cytoplasmic fraction is alternatively reacted with antibodies to the viral proteins, to provide an antigen/antibody precipitate which is separated from the remainder of the material by centrifugation. The separated precipitate is washed in phosphate-buffered saline to remove all traces of Nonidet, fixing agent, sucrose and MRC5 cell protein, this recipitate forming the required vaccine. If desired aluminium hydroxide may be added to the precipitate, as an adjuvant only.

(v) In another alternative step a suitable organic solvent which reacts with water in preference to the proteins in the fixed cytoplasmic fraction, is added to that fraction and precipitates the proteins therein. Acetone, ethanol and methanol are examples of such solvents and are added at temperatures between 0° C. and −30° C., at a ratio of 10 parts of solvent to 1 part of water in the cytoplasmic fraction. Preferably the solvent temperature is between −10° C. and −20° C. The precipitate is separated by centrifugation and the remaining solvent on the precipitate is evaporated off. The precipitated proteins are then either re-suspended in phosphate - buffered saline or added to aluminium hydroxide adjuvant.

Since this step precipitates all the proteins in the purified cytoplasmic fraction, it is necessary that proteins from the calf serum used at an earlier stage shall previously have been removed. If an organic solvent is used to effect protein precipitation, it is therefore necessary to have subjected the MRC5 cells to serum deprivation, as described above, before infection with the virus.

The electrophoresis gel patterns of the Troisbell HSV1 virus used for preparation of the vaccine are shown in FIGS. 1 and 2, in which molecular weights M are shown as values $\times10^4$, and in which FIG. 2 is an expansion of part of FIG. 1, obtained by the use of a different gel. In addition to identifying the virus strain as HSV1, by virtue of molecular weight patterns which are common to all HSV1 strains, these gel patterns exhibit characteristics which will readily be recognised by one skilled in the art as being unique, and will enable identification of the Troisbell strain. Particularly characteristic of the Troisbell virus are the protein groups at molecular weights between $8\times10^4$ and $9\times10^4$, and between $3\times10^4$ and $3.6\times10^4$. Moreover these groupings, taken in conjunction with groupings between $1.8\times10^4$ and $2.1\times10^4$, between $5.5\times10^4$ and $6\times10^4$ and between $12\times10^4$ and $13\times10^4$, define a unique pattern which will enable identification of the Troisbell virus, vaccines derived therefrom, and of antibodies produced by vaccinated subjects. Use of this vaccine will thereby render it possible to determine whether the presence in a subject of antibodies to HSV1 is attributable to vaccination or to infection.

The Troisbell virus strain is held by the Department of Medical Microbiology, The University of Birmingham, Birmingham, England and is available on application on the same terms as those laid down by the Budapest Treaty.

A sample of the Troisbell virus strain has also been deposited at the Collection National de Cultures de Micro-organismes in France under reference I-224. 510 patients have been treated with vaccine prepared according to the invention, without adverse effect. The tested vaccines were prepared by methods including the precipitation steps (iii) or (iv) or (v) described above.

Treatment of subjects with vaccine according to the invention has been found to prevent infection with herpes simplex virus type 2 (HSV2), the agent of genital herpes, and also to mitigate the recurrence of attacks in infected persons. According to established authorities, without vaccination 75% of the sexual partners of HSV2 sufferers develop the disease within one year. Tests with vaccines according to the invention have shown that less than 1% of previously unaffected persons who have been vaccinated develop genital herpes even after prolonged exposure.

Additionally, treatment by the vaccine of persons who have already suffered one attack of genital herpes has been found to result in a recurrence of an attack in only 25% of cases in a two year period after vaccination.

HSV2 is now recognised as a major health problem in some countries. It is estimated to affect 30% of the sexually active population in the U.S.A., and is increasing annually by between 250,000 and 500,000 cases. HSV2 can, if contracted at a late stage in pregnancy, have serious effect on the foetus. Additionally, infection with HSV2 has been shown to have a statistical connection with the incidence of cervical cancer.

The present invention provides a method of preparing a vaccine against HSV2, and in one of its aspects relates to a specific vaccine prepared from a virus strain which is itself believed to be particularly pure and safe.

We claim:

1. A method of preparing a vaccine against a Herpes simplex virus comprising the sequential steps of:

(a) infecting cells with a Herpes virus;

(b) incubating the infected cells;

(c) treating the infected cells with a surfactant to separate the nuclei of the infected cells from the cytoplasmic fraction thereof;

(d) contacting said cytoplasmic fraction with a fixing agent to stabilize viral antigenic proteins and inactivate residual DNA in said cytoplasmic fraction; and (e) separating said viral antigenic proteins from said cytoplasmic fraction, said separated viral antigenic proteins providing the active constituent of said vaccine.

2. A method as claimed in claim 1 in which stabilization of the viral antigenic proteins is effected by addition of formaldehyde to said cytoplasmic fraction.

3. A method as claimed in claim 1 wherein the separation of Herpes virus antigens is effected by steps which include reacting said cytoplasmic fraction with antibodies to the Herpes virus antigens to form an antigen/antibody complex, and separating the antigen/antibody complex so formed.

4. A method as claimed in claim 1 wherein a detergent is used to separate the nuclei from the cytoplasmic fraction.

5. A method as claimed in claim 1 wherein said cells are human embryonic cells.

6. A method according to claim 1 wherein said cells are MRCS human cells.

7. A method as claimed in claim 1 in which stabilization of the viral antigenic proteins is effected by addition of glutaraldehyde to said cytoplasmic fraction.

8. A method as claimed in claim 1 wherein said Herpes virus is Herpes simplex virus type 1.

9. A method as claimed in claim 8 wherein said Herpes simplex virus type 1 is the Troisbell virus strain.

10. The method of claim 1 wherein an extract obtained by treatment with said surfactant is centrifuged to obtain a supernatant.

11. The method of claim 10 wherein the centrifugation is conducted at about 650 x g.

12. A method as claimed in claim 1, comprising the steps of cultivating said cells in a medium containing an animal serum, and subsequently subjecting the cultivated cells to serum deprivation prior to infection with said virus.

13. A method as claimed in claim 12, in which separation of the viral antigenic proteins is effected by the addition of aluminium hydroxide to said cytoplasmic fraction.

14. A method as claimed in claim 12 in which separation of the viral antigenic proteins is effected by steps which include the addition to said cytoplasmic fraction of an organic solvent which will react with water in preference to proteins in said cells.

15. A method as claimed in claim 14 in which said organic solvent is selected from the group consisting of acetone, ethanol and methanol.

16. A method as claimed in claim 1 wherein separation of the viral antigenic proteins is effected by steps which include reacting said cytoplasmic fraction with antibodies to non-viral proteins in said cells and discarding the antigen/antibody complex so formed, whereby said viral antigenic proteins are retained.

17. The method of claim 16 wherein said antibodies are immobilized.

18. The method of claim 16 wherein said antibodies include antibodies to the proteins of said cells.

19. The method of claim 16 wherein the cells are cultivated in a nutrient medium containing serum, and the antibodies include antibodies to serum proteins of said nutrient medium.

20. The method of claim 19 wherein said cells are MRC 5 cells and said antibodies include antibodies to MRC 5 cell proteins.

21. A method as claimed in claim 14 or claim 15 in which the temperature of said solvent is between 0° C. and −30° C.

22. A method as claimed in any one of claims 3, 14 or 16 which includes the addition of aluminium hydroxide to the separated viral antigenic proteins.

* * * * *